US008879430B2

(12) United States Patent
Goodman et al.

(10) Patent No.: US 8,879,430 B2
(45) Date of Patent: Nov. 4, 2014

(54) ELECTRONIC HOOK SWITCH CAPABILITY FOR A MOBILE DEVICE CONNECTED DOCKING STATION

(75) Inventors: Lee N. Goodman, Tyngsboro, MA (US); Elliot G. Eichen, Arlington, MA (US); Rafael Andres Gaviria Velez, Medford, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 362 days.

(21) Appl. No.: 13/193,656

(22) Filed: Jul. 29, 2011

(65) Prior Publication Data

US 2013/0028144 A1 Jan. 31, 2013

(51) Int. Cl.

| | |
|---|---|
| ***H04W 4/16*** | (2009.01) |
| ***H04L 12/66*** | (2006.01) |
| ***H04L 29/06*** | (2006.01) |

(52) U.S. Cl.

CPC ............ *H04L 12/66* (2013.01); *H04L 65/1083* (2013.01); *H04W 4/16* (2013.01); *H04L 65/1096* (2013.01); *H04L 65/1069* (2013.01)

USPC ...... 370/259; 370/352; 455/556.1; 455/569.1

(58) Field of Classification Search

USPC ............ 370/259, 260, 352; 455/556.1, 569.1

See application file for complete search history.

(56) References Cited

U.S. PATENT DOCUMENTS

| | | | | |
|---|---|---|---|---|
| 6,987,988 | B2 * | 1/2006 | Uchiyama | 455/557 |
| 7,110,789 | B1 * | 9/2006 | Curtiss et al. | 455/556.1 |
| 8,019,279 | B2 * | 9/2011 | Bauchot et al. | 455/41.2 |
| 8,391,930 | B1 * | 3/2013 | Delker et al. | 455/567 |
| 8,660,605 | B2 * | 2/2014 | Fleming et al. | 455/555 |
| 8,761,841 | B2 * | 6/2014 | Zakarias et al. | 455/569.1 |
| 2006/0166674 | A1 * | 7/2006 | Bennett et al. | 455/445 |
| 2007/0004473 | A1 * | 1/2007 | Clark et al. | 455/575.2 |
| 2008/0278894 | A1 * | 11/2008 | Chen et al. | 361/681 |
| 2008/0304688 | A1 * | 12/2008 | Kumar | 381/370 |
| 2009/0059907 | A1 * | 3/2009 | Sindhwani et al. | 370/354 |
| 2010/0210315 | A1 * | 8/2010 | Miyake | 455/569.2 |
| 2011/0053643 | A1 * | 3/2011 | Shmunis | 455/556.1 |
| 2012/0046074 | A1 * | 2/2012 | Gittleman et al. | 455/557 |
| 2012/0155454 | A1 * | 6/2012 | Eichen et al. | 370/352 |

* cited by examiner

*Primary Examiner* — Ahmed Elallam

(57) ABSTRACT

A Voice over Internet Protocol (VoIP) docking station includes a docking port configured to physically dock with a mobile device, and a Universal Serial Bus (USB) port coupled to a hands free device. The VoIP docking station further includes a processing unit configured to receive signaling via the USB port, and determine an on-hook or off-hook status of the hands free device based on the signaling.

20 Claims, 16 Drawing Sheets

ELECTRONIC HOOK SWITCH CAPABILITY FOR A MOBILE DEVICE CONNECTED DOCKING STATION

BACKGROUND

A recent trend for reducing service costs in telecommunications networks involves the use of Voice over Internet Protocol (VoIP) for carrying calls between source and destination phones. IP networks typically incur minimal costs to carry data from sources to destinations, as opposed to Public Switched Telephone Networks (PSTN) which typically incur much higher costs to carry phone calls from sources to destinations. By using VoIP (e.g., IP packets carrying audio data) for carrying a call for most of the distance of the call, instead of using a PSTN, the cost of the call can be reduced relative to having a PSTN carry the entirety of the call. Usually, VoIP involves a call being carried via the Internet to a point in the PSTN very close to the call destination. At that point, the call is switched to the PSTN for completion of the connection with the call destination. By minimizing the distance that the call is carried on the PSTN, the cost of the call may be substantially reduced relative to solely using the PSTN for the entirety of the call.

BRIEF DESCRIPTION OF THE DRAWINGS

FIGS. 2A and 2B are diagrams that depict an exemplary docking station into which a mobile device may be docked;

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

In embodiments described herein, "electronic hook switch" capability, that enables a mobile device user to remotely accept an incoming call from a wired or wireless hands free device (e.g., hands free headset) or to remotely terminate (e.g., hang up) an active phone call, may be implemented in a docking station into which a mobile device, such as a mobile phone, may be docked while the docking station is used for VoIP calls. VoIP calls in progress may be continued via the mobile device if the mobile device is undocked from the docking station during the calls. A caller may use a hands free device, such as a headset, in conjunction with the docking station during a VoIP call, and on-hook or off-hook messages associated with the "electronic hook switch" capability may be transmitted to the docking station to notify the docking status of the on-hook or off-hook status of the hands free device. In other implementations, messages associated with mid-call control features, such as, for example, call volume control, call holding, call transfer, or call conferencing, may be transmitted to the docking station to notify the docking station of mid-call control features to implement.

Figure 1:
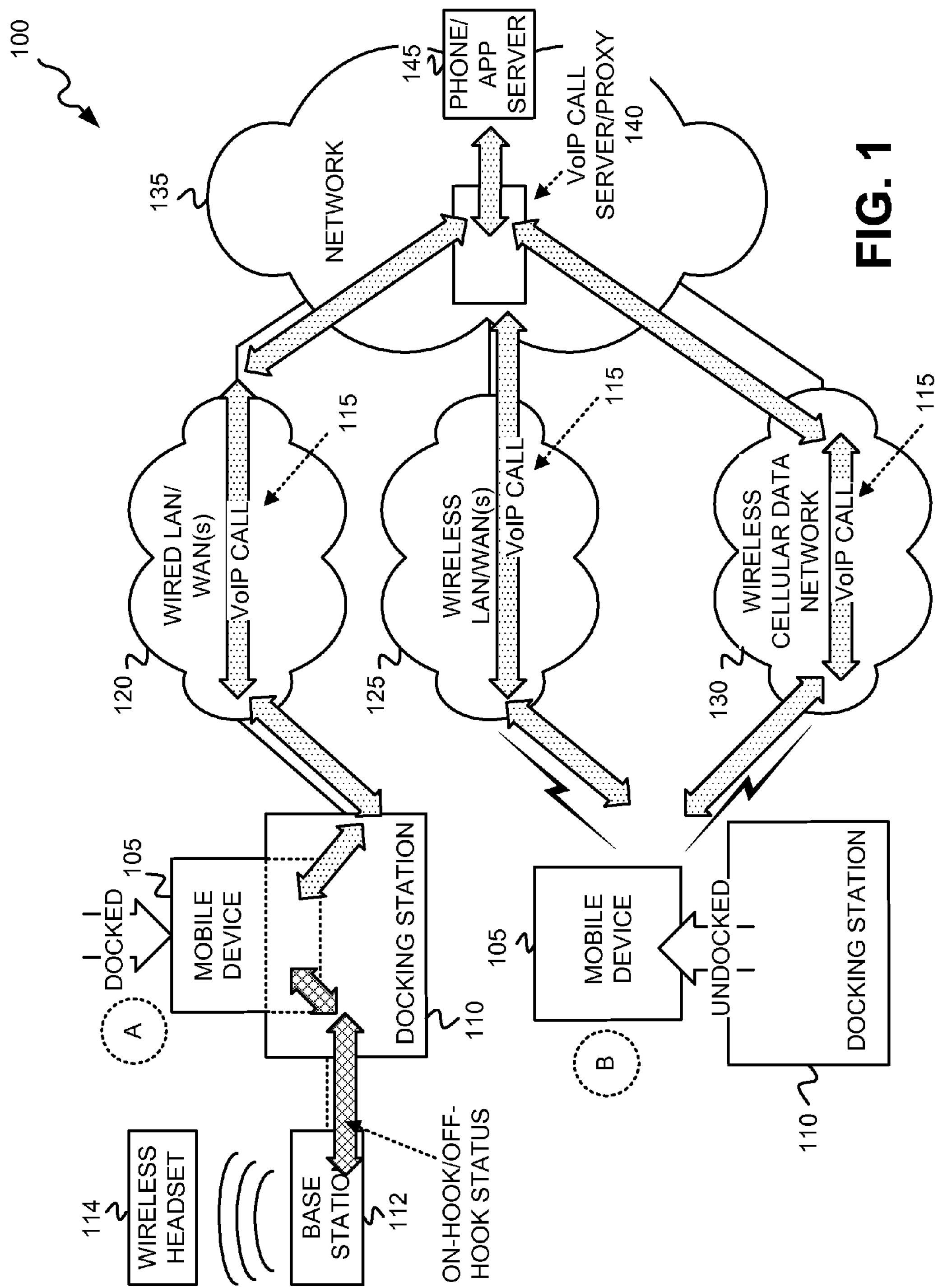
FIG. 1 is a diagram that depicts an exemplary network environment in which electronic hook switch capability is integrated into a mobile device docking station such that VoIP phone calls may be remotely accepted, or terminated, by a wireless hands free device used in conjunction with the docking station.

FIG. 1 is a diagram that depicts an exemplary network environment 100 in which electronic hook switch capability is integrated into a docking station 110, which is docked with a mobile device 105 such a mobile phone, such that VoIP phone calls may be remotely accepted, or terminated, by a wireless hands free device used in conjunction with the docking station. In the exemplary environment 100 of FIG. 1, VoIP call continuity may be maintained between mobile device 105 and a phone or application server when mobile device 105 is docked with, or undocked from, docking station 110. Mobile device 105 may include, for example, a cellular telephone (e.g., a smart phone), a tablet computer, a personal digital assistant (PDA), or other type of digital computing device that has the capability to communicate via multiple different networks (and different network connections). Docking station 110 may include a Voice over Internet Protocol (VoIP) phone that has a connection to a VoIP network and which also has a docking port which permits mobile device 105 to be "docked" with docking station 110. As shown in FIG. 1, when mobile device 105 is docked in docking station 110 (designated with a "A" within a dashed circle) a headset base station 112 may be connected to docking station 110, or integrated within docking station 110, to transmit media (e.g., audio or video) associated with VoIP calls wirelessly to/from wireless headset 114 via docking station 110. Wireless headset 114 is shown by way of example in FIG. 1. Other types of hands free devices may be used in conjunction with base station 112 and/or docking station 110. As shown in FIG. 1, on-hook or off-hook status messages, associated with implementing "electronic hook switch" capability, may be transmitted from base station 112 to docking station 110. Messages and media may be transmitted bi-directionally (i.e., transmitted to, or from, docking station 110) between base station 112 or wireless headset 114 and docking station 110. For example, docking station 110 may transmit a status message to base station 112 that confirms that a "mute" function has been activated.

FIG. 1 depicts the maintenance of VoIP call continuity in the circumstance where mobile device 105 has been docked in docking station 110 (e.g., physically inserted into a docking port as designated with a "A" within a dashed circle in FIG. 1) and has been engaged in a VoIP call 115 via a network connection to a wired local area network (LAN)/wide area network (WAN) 120, and then is undocked from docking station 110 (designated with a "B" within a dashed circle in FIG. 1) and maintains the continuity of the VoIP call via a network connection to either wireless LAN/WAN 125 or wireless cellular data network 130.

While docked in docking station 110, a network connection via wired LAN/WAN 120 may be available to mobile device 105 via docking station 110. Therefore, a VoIP client application at mobile device 105 may determine that the wired connection is available via LAN/WAN network 120, and may route VoIP call 115 from mobile device 105 through docking station 110 via wired LAN/WAN 120. Routing VoIP call 115 from mobile device 105 through wired LAN/WAN 120 may include sending Session Initiation Protocol (SIP) register and invite messages to establish a session via the wired connection. Wired LAN/WAN 120 may include a corporate LAN/WAN, and/or other type of LAN/WAN (e.g., a home office LAN/WAN), that may include a wired Ethernet or IP network. VoIP call 115 may traverse wired LAN/WAN 120, a network 135 and a proxy or VoIP call server 140 to reach a destination phone or application server 145.

Network 135 may include one or more networks that implement Ethernet protocol or Internet Protocol (IP). Network 135 may include a telecommunications network (e.g., a Public Switched Telephone Network (PSTN)), a local area network (LAN), a wide area network (WAN), a metropolitan area network (MAN), an intranet, the Internet, or a cable network (e.g., an optical cable network). Proxy/VoIP call server 140 may include a VoIP call handling server that processes and forwards VoIP calls towards the call destination (or from a call destination to mobile device 105).

Mobile device 105 may, when engaging in a VoIP call via a wired connection, also activate a second wireless connection via wireless LAN/WAN 125 or wireless cellular data network 130. In one implementation, activation of the second wireless connection may include powering on an appropriate communication interface at mobile device 105 and establishing wireless connectivity with networks 125 or 130 via the appropriate communication interface.

Mobile device 105 may be undocked (e.g., physically removed from the docking port) from docking station 110, as depicted with a "B" within a circle in FIG. 1. While undocked from docking station 110, the second wireless connection, via wireless LAN/WAN 125 or wireless cellular data network 130, the connectivity of which has already been established, may be available to mobile device 105. Wireless LAN/WAN 125 may include a wireless LAN based on IEEE 802.11 standards (i.e., a "wi-fi" network) or other standards/protocols. Wireless cellular data network 130 may include a wireless public land mobile network (PLMN) (e.g., a Code Division Multiple Access (CDMA) 2000 PLMN, a Global System for Mobile Communications (GSM) PLMN, a Long Term Evolution (LTE) PLMN and/or other types of PLMNs) that includes a packet-switched network, such as, for example, a General Packet Radio Service (GPRS), a Cellular Digital Packet Data (CDPD), or a Mobile IP network.

The VoIP client application at mobile device 105 may determine that mobile device 105 has been undocked from docking station 110 and that there has been a loss of network connectivity via wired LAN/WAN 120. The VoIP client application at mobile device 105 may then maintain the continuity of VoIP call 115 by re-directing VoIP call 115 via either wireless LAN/WAN 125 or wireless cellular data network 130. Re-directing VoIP call 115 from mobile device 105 through wireless LAN/WAN 125 or wireless cellular data network 130 may include sending Session Initiation Protocol (SIP) re-register and re-invite messages to establish a session via the wireless connection. As shown in FIG. 1, VoIP call 115 may traverse wireless LAN/WAN 125 or wireless cellular data network 130, network 135 and proxy/VoIP call server 140 to reach destination phone 145.

Thus, as depicted in FIG. 1, a VoIP call 115 initiated by docked mobile device 105 through docking station 110 and a first, wired network connection via wired LAN/WAN 120 may be re-directed over a second wireless connection via wireless LAN/WAN 125 or wireless cellular data network 130. The continuity of VoIP call 115 may, therefore, be maintained such that no substantial gap, or loss of quality, in the call may occur.

Figure 2A:
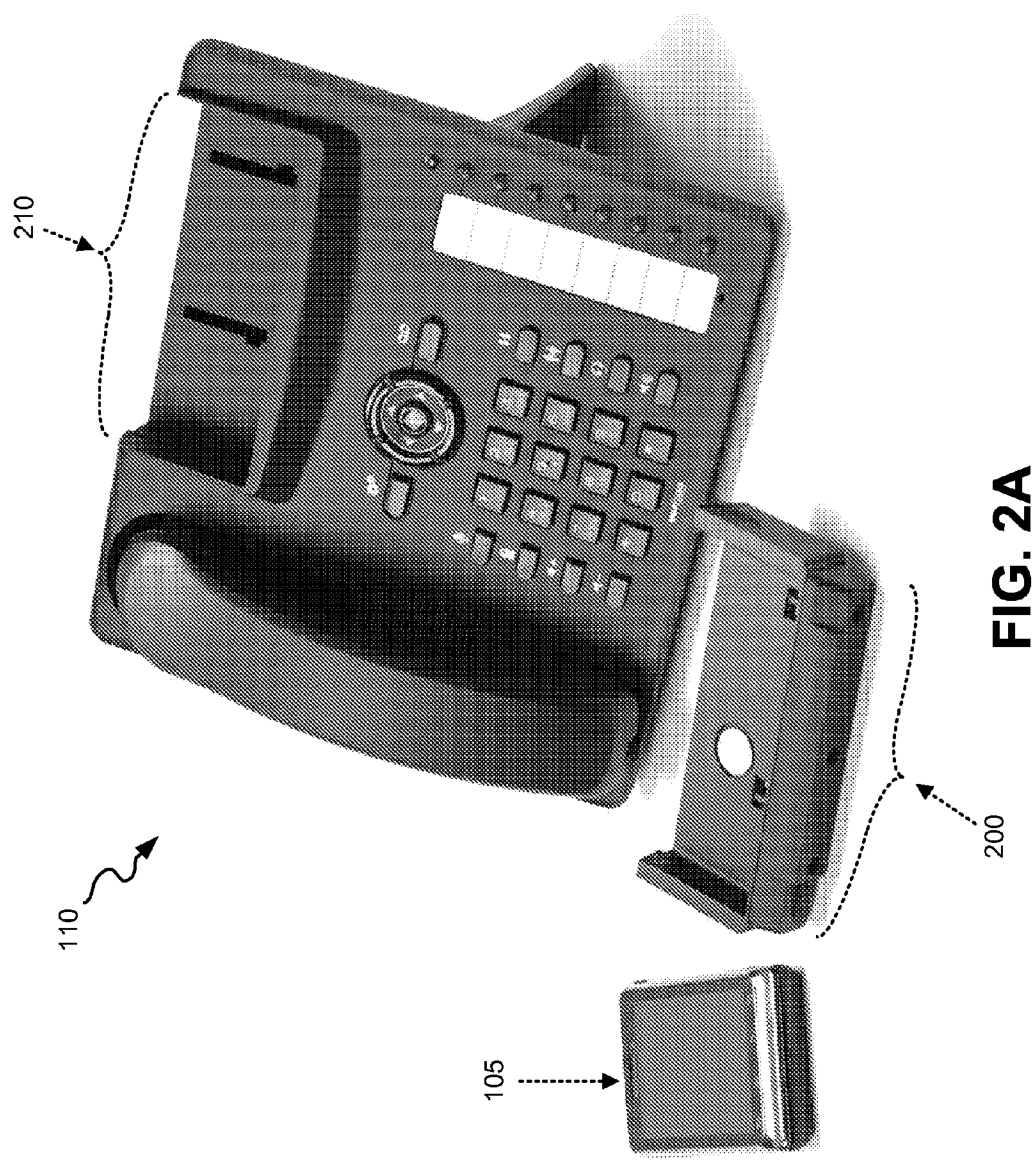
Figure 2B:
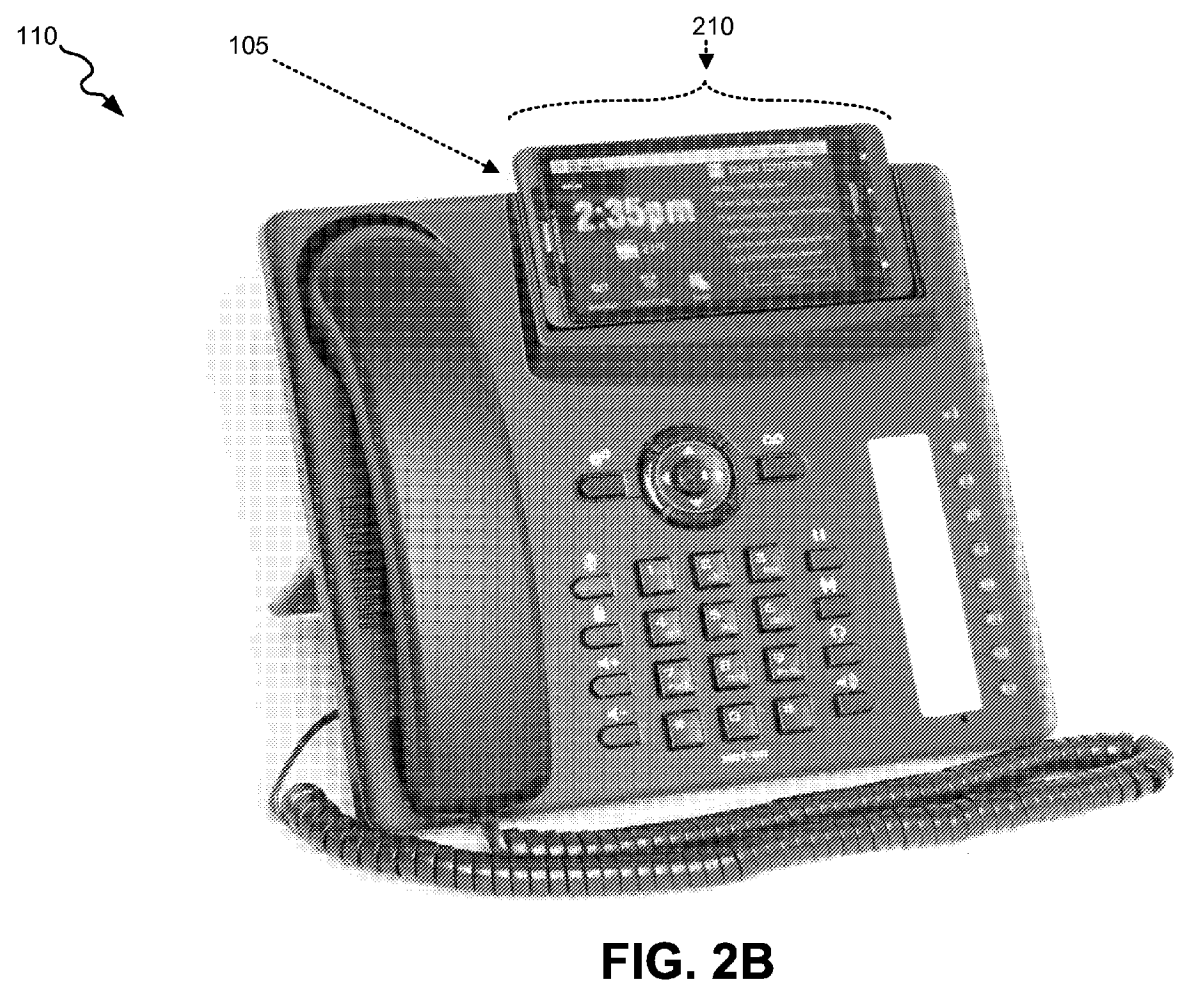

FIGS. 2A and 2B depict an example of a physical configuration of docking station 110, mobile device 105, a mobile device tray 200, and docking port 210, and the physical interconnection of docking station 110, mobile device 105, and mobile device tray 200. Mobile device tray 200 may include a physical configuration that fits the external configuration of mobile device 105, such that mobile device 105 may be inserted into mobile device tray 200. In addition, mobile device 105's Universal Serial Bus (USB) port (or other connector ports) may interconnect with an appropriate physical and electrical port on mobile device tray 200. Subsequent to insertion of mobile device 105 into mobile device tray 200, tray 200 may be inserted into a docking port 210 of docking station 110 to complete the USB port interconnection between mobile device 105 and docking station 110. FIG. 2B depicts mobile device 105 inserted into docking port 210 of docking station 110. While docked in docking station 110, mobile device 105 may be used for controlling the operation of docking station 110. For example, if mobile device 105 has a touch panel display, then the touch panel display may be used for dialing a VoIP call, instead of using a keypad on docking station 110.

Figure 3:
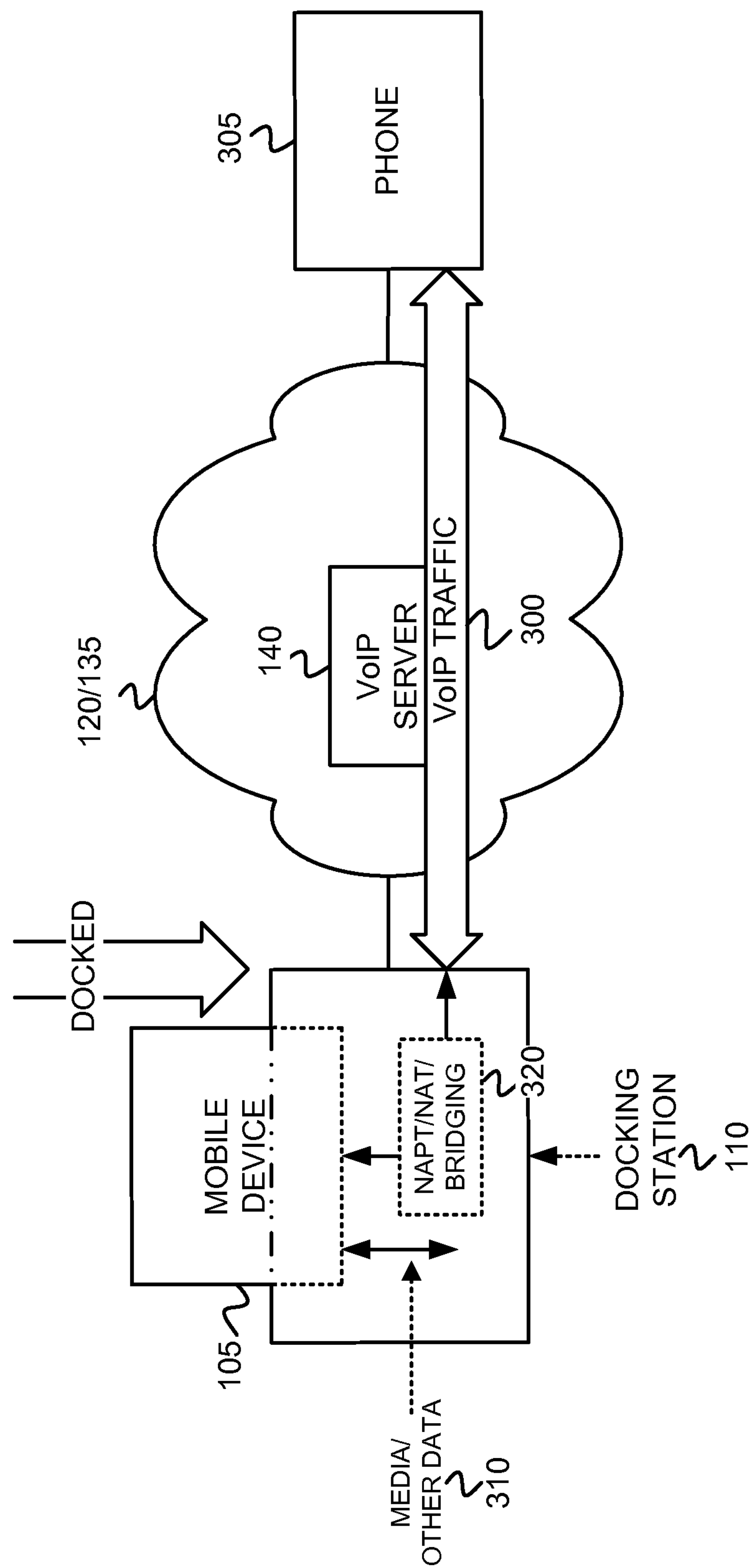
FIG. 3 is a diagram that depicts the exemplary docking station of FIG. 1 enabling a VoIP connection between a docked mobile device and a network.

FIG. 3 depicts circumstance "A" of FIG. 1, where mobile device 105 is docked with docking station 110, and mobile device 105 sends a VoIP call using VoIP traffic 300 via wired LAN/WAN 120 and network 135 to phone 305. As shown in FIG. 3, mobile device 105 may be docked (i.e., physically inserted into a docking port) with docking station 110. Upon being docked with docking station 110, mobile device 105 may exchange media (e.g., audio or video) or other data 310 with docking station 110. The exchanged media 310 may include audio streamed from a microphone of docking station 110 to mobile device 105, or from a microphone of mobile device 105 to docking station 110. The exchanged media may further include video streamed from a camera (or memory) of docking station 110 to mobile device 105, or from a camera (or memory) of mobile device 105 to docking station 110.

As further shown in FIG. 3, docking station 110 may connect to wired LAN/WAN 120 and network 135 for sending and/or receiving VoIP traffic 300 to/from mobile device 105 via VoIP server 140 to/from phone 305. Docking station 110 may forward VoIP traffic 300 from network 120/135 to mobile device 105, and from mobile device 105 to network 120/135 via a system 320 that implements Network Address Port Translation (NAPT), Network Address Translation (NAT) or a bridging mode. When implementing NAPT or NAT, system 320 may route packets associated with VoIP traffic 300 to/from mobile device 105. A side or port of docking station 110 facing network 120/135 may have a public, routable Internet Protocol (IP) address on network 120/135, while a side or port of docking station 110 facing mobile device 105 may have a statically configured private IP address. The routable IP address of docking station 110 facing network 120/135 may be statically configured, or may be obtained via the Dynamic Host Configuration Protocol (DHCP) from network 120/135. Mobile device 105 may have a statically configured private IP address (e.g., on a same network as the private IP address of docking station 110). Mobile device 105 may use the routable IP address of docking station 110 as a default gateway for sending VoIP packets to phone 145 via network 120/135 and VoIP server 140. A physical and layer 2 connection between docking station 110 and mobile device 105 may include Ethernet over Universal Serial Bus (USB) (e.g., Ethernet frames encapsulated in USB packets). Media 310 may be streamed from the private IP address associated with mobile device 105 to the private IP address associated with docking station 110, or may be streamed in the reverse direction.

When implementing the bridging mode, system 320 may forward packets, at layer 2, from network 120/135, though docking station 110, to mobile device 105. Additionally, system 320 may forward packets, at layer 2, from mobile device 105, though docking station 110, to network 120/135. Docking station 110 may have an IP address, routable in network 120/135, and mobile device 105 may also have a different IP address that is routable in network 120/135. System 320, implementing the bridging mode, may forward packets received at docking station 110 from network 120/135 to the routable IP address of mobile device 105. Additionally, when implementing the bridging mode, system 320 may forward packets, received from mobile device 105 at the routable IP address of docking station 110, to network 120/135.

Figure 4:
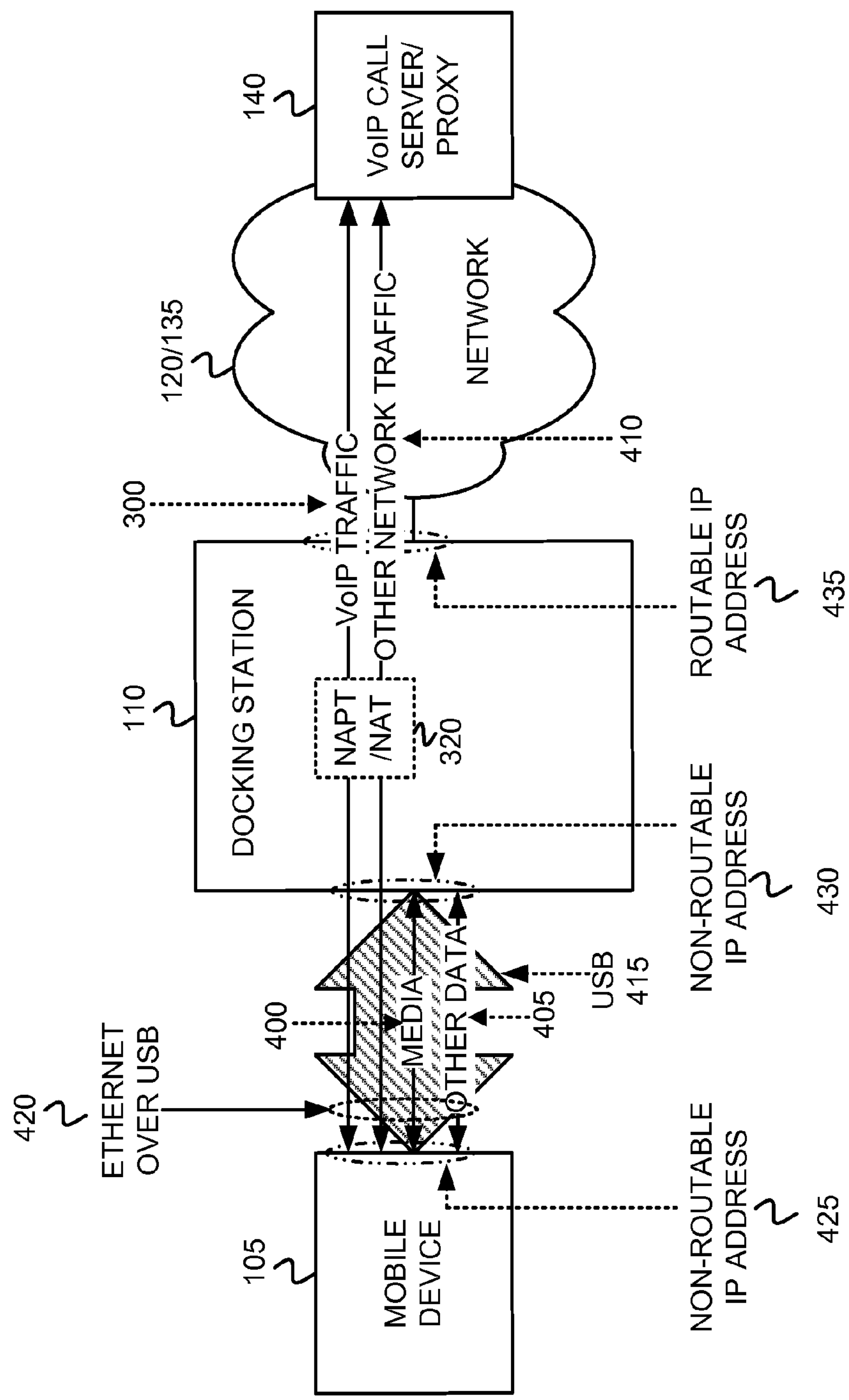
FIG. 4 is a diagram that depicts an exemplary implementation of the docking station of FIG. 1 in which the docking station implements Network Address and Port Translation or Network Address Translation for establishing a VoIP connection between a mobile device and a network.

FIG. 4 is a diagram that depicts an exemplary implementation of docking station 110 of FIG. 1 in which docking station 110 implements NAPT or NAT for establishing a VoIP connection between mobile device 105 and network 120/135. When mobile device 105 is docked into docking station 110, as shown in FIG. 1, media 400, other data 405, VoIP traffic 300 and other network traffic 410 may be sent to and from mobile device 105 via a Universal Serial Bus (USB) 415, as further shown in FIG. 4. Mobile device 105, therefore, acts as a USB peripheral, and docking station 110 acts as a USB host. Ethernet over USB protocol 420 may be used as the physical and layer 2 connection between docking station 110 and mobile device 105.

As shown in FIG. 4, mobile device 105 may have a statically configured IP address 425 that is non-routable from network 120/135 (but routable between IP address 430 of docking station 110 and IP address 425 of mobile device 105). As further shown in FIG. 4, docking station 110 may also have a statically configured IP address 430 that is non-routable from network 120/135 (but routable between IP address 430 of docking station 110 and IP address 425 of mobile device 105), where IP address 430 resides on a same private network (not shown) on which IP address 425 of mobile device 105 resides. A private network (not shown in FIG. 4), therefore, exists between mobile device 105 and docking station 110 via USB 415.

As further shown in FIG. 4, docking station 110 may have an IP address 435 that is routable from network 120/135. Routable IP address 435 may be statically configured, or may be obtained via the DHCP protocol from network 120/135. Docking station 110 may, therefore, act as a DHCP server to mobile device 105, thereby obtaining routable IP address 435 that may be used by network 120/135 to forward VoIP traffic 300 and other network traffic 410 to mobile device 105 via NAPT/NAT system 320. Non-routable, private IP address 425 on mobile device 105 and non-routable, private IP address 430 on docking station 110 may be statically configured prior to the connection of mobile device 105 to docking station 110 via USB 415. By having a routable IP address 435 on network 120/135, a network administrator may manage docking station 110 including, for example, providing software upgrades, firewall management, etc. The ability to address docking station 110 from network 120/135 may not be available when docking station 110 acts as an IP bridge (e.g., the exemplary bridging implementation of FIG. 5).

Media 400 may include audio or video data (e.g., streaming audio or video) that may be streamed from mobile device 105 for playback on docking station 110, or that may be streamed from docking station 110 for playback on mobile device 105. Media 400 may be streamed from mobile device 105 IP address 425 to docking station IP address 430, or from docking station IP address 430 to mobile device 105 IP address 425. Other data 405 may include keypad information (e.g., indications of keypad presses on docking station 110), status information (e.g., voicemail message indicator light, etc.), and other information that may be exchanged between mobile device 105 IP address 425 and docking station 110 IP address 430. Other data 405 may further include data other than audio or video data, such as, for example, web traffic data. The transfer of media 400 and/or other data 405 may be through sockets, such as Transmission Control Protocol (TCP) or User Datagram Protocol (UDP) sockets.

VoIP traffic 300 may include VoIP signaling traffic (e.g., Session Initiation Protocol (SIP) traffic) and VoIP media traffic (e.g., Real-time Transport Protocol (RTP) or RTP Control Protocol (RTCP)) and may be forwarded through docking station 110 via NAPT/NAT system 320. NAPT/NAT system 320 may implement a forwarding table that forwards packets to/from mobile device 105 through docking station 110 to routable network 120/135. For VoIP applications, the forwarding table may be configured to pass SIP and RTP or RTCP traffic to/from mobile device 105 to routable network 120/135. Additionally, other network traffic 410 may be forwarded to/from mobile device 105 through docking station 110 to routable network 120/135 by the forwarding table based on NAPT or NAT filtering. Other network traffic 410 may include Internet traffic (e.g., web browsing), etc. NAPT/NAT system 320 may receive packets from IP address 425 of mobile device 105 sent to routable IP address 435 of docking station 110, and the forwarding table may forward the packets to an appropriate next hop IP address in network 120/135 (e.g., to a next hop switch or router). NAPT/NAT system 320 may further receive packets from an IP address in network 120/135 sent to routable IP address 435, and the forwarding table may forward the packets to non-routable IP address 425 of mobile device 105. A network administrator of network 120/135 may designate what kinds of traffic are permissible, and the forwarding table at docking station 110 may be configured appropriately (e.g., e-mail and web browsing may be forwarded whereas other undesirable traffic may be blocked during the forwarding process). A forwarding table implemented at mobile device 105 may use routable IP address 435 of docking station 110 as the default gateway address for all outgoing packets.

Figure 5:
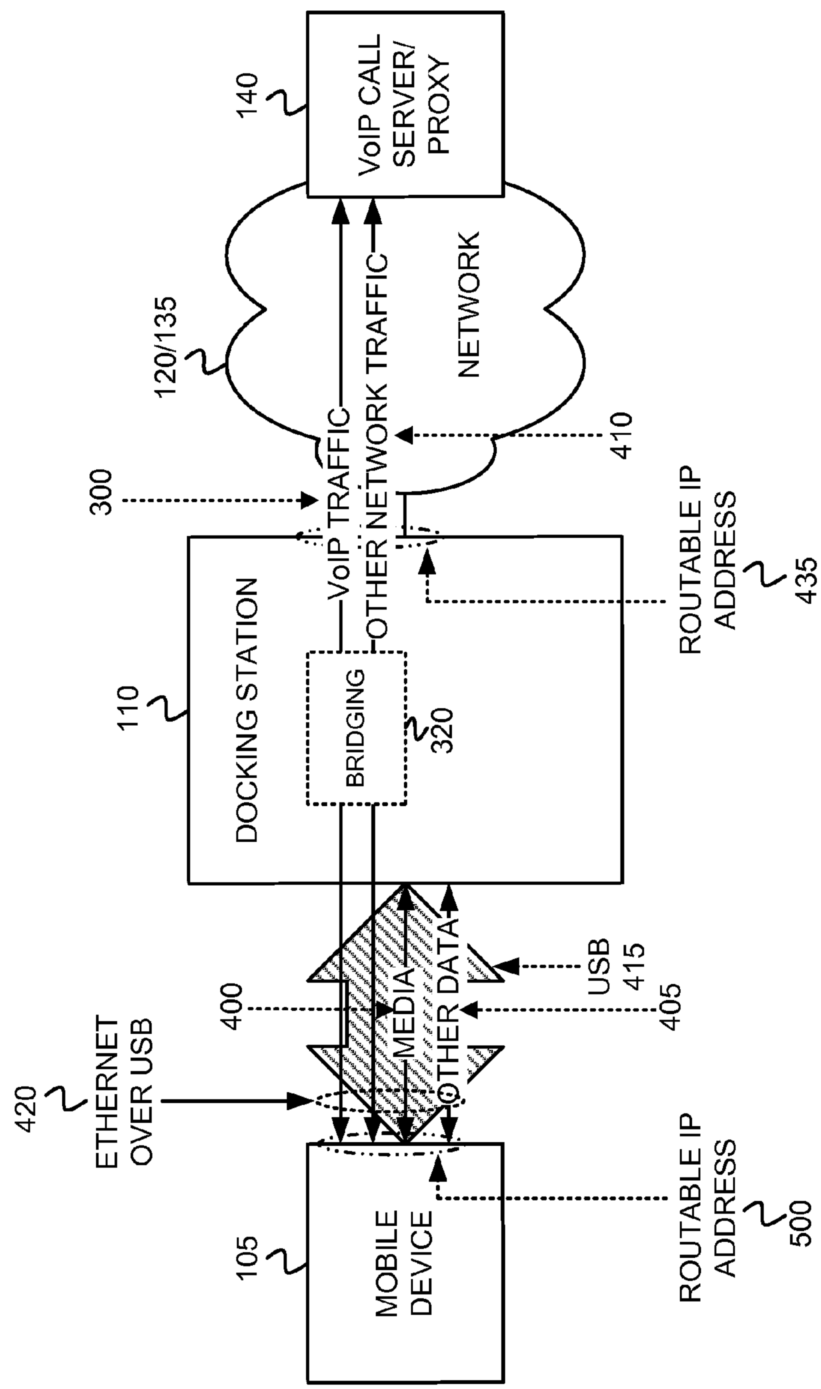
FIG. 5 is a diagram that depicts an exemplary implementation of the docking station of FIG. 1 in which the docking station implements a bridging mode for establishing a VoIP connection between the mobile device and a network.

FIG. 5 is a diagram that depicts an exemplary implementation of docking station 110 of FIG. 1 in which docking station 110 implements a bridging mode for establishing a VoIP connection between mobile device 105 and network 120/135. When mobile device 105 is docked into docking station 110, as shown in FIG. 1, media 400, other data 405, VoIP traffic 300 and other network traffic 410 may be sent to and from mobile device 105 via a Universal Serial Bus (USB) 415, as further shown in FIG. 5. Mobile device 105, therefore, acts as a USB peripheral, and docking station 110 acts as a USB host. Ethernet over USB protocol 420 may be used as the physical and layer 2 connection between docking station 110 and mobile device 105.

As shown in FIG. 5, mobile device 105 may have an IP address 500 that is routable from network 120/135. As further shown in FIG. 5, docking station 110 may also have a IP address 435 that is routable from network 120/135. Routable IP addresses 500 and 435 may be statically configured, or may be obtained via the DHCP protocol from network 120/135. Docking station 110 may, therefore, act as a DHCP server to mobile device 105, thereby obtaining routable IP addresses 500 and 435 that may be used by network 120/135 to forward VoIP traffic 300 and other network traffic 410 to mobile device 105 via bridging system 320.

Media 400 may be streamed from mobile device 105 for playback on docking station 110, or may be streamed from docking station 110 for playback on mobile device 105. Media 400 may be streamed from mobile device 105 IP address 500 to docking station IP address 435, or from docking station IP address 435 to mobile device 105 IP address 500. Other data 405 may include keypad information, status information, and other information that may be exchanged between mobile device IP address 500 and docking station 110 IP address 435.

VoIP traffic 300 may include VoIP signaling traffic (e.g., SIP traffic) and VoIP media traffic (e.g., RTP or RTCP) and may be forwarded through docking station 110 via bridging system 320. Bridging system 320 may forward, at layer 2, packets to/from mobile device 105 through docking station 110 to routable network 120/135. Bridging system 320 may "transparently" forward packets, without any NAPT or NAT filtering as performed in the implementation of FIG. 4, from mobile device 105 to network 120/135 and from network 120/135 to mobile device 105. For example, if wired LAN/WAN 120 includes an Ethernet Local Area Network (LAN), bridging system 320 may forward Ethernet frames from network 120/135 to mobile device 105 based on Medium Access Control (MAC) addresses contained in the Ethernet frames.

Figure 6:
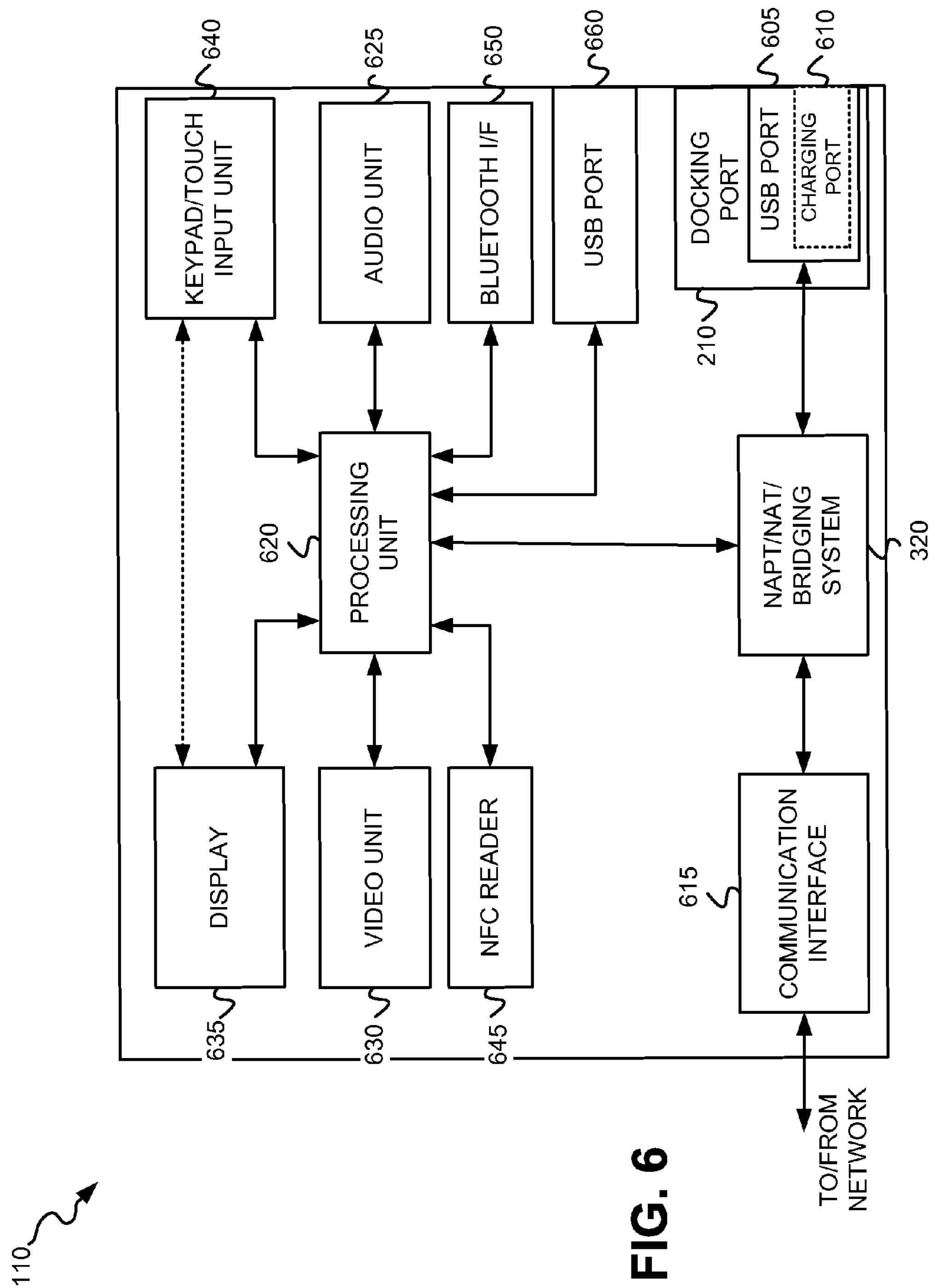
FIG. 6 is a diagram that depicts exemplary components of the docking station of FIG. 1.

FIG. 6 is a diagram that depicts exemplary components of docking station 110. Docking station 110 may include docking port 210, NAPT/NAT/Bridging system 320, a communication interface 615, a processing unit 620, an audio unit 625, a video unit 630, a display 635, a keypad/touch input unit 640, a Near Field Communication (NFC) reader 645, a Bluetooth interface 650, and a USB port 660.

Docking port 210 may include a port that may physically engage with a tray into which mobile device 105 is inserted. The shape and size of docking port 210 may be different based on a different external configuration of mobile device 105. Docking port 210 may further include a USB port 605, which also includes a charging port 610 (i.e., USB port 605 may simultaneously act as a data port and a battery charging port). USB port 605 of FIG. 6 may correspond to USB port 415 of FIGS. 4 and 5. Though a single USB port 605 is depicted in FIG. 6, docking station 110 may include multiple USB ports (not shown) and/or a USB hub. For example, docking station 110 may include USB port 660 that is separate from USB port 605 provided in docking port 210. USB port 660 may be used, for example, for connecting headset base station 112 to docking station 110 for sending/receiving media (e.g., audio) to/from headset 114, and for receiving on-hook/off-hook status messages and/or mid-call control messages from headset 114. Charging port 610 may include an electrical connection for supplying a charging current to a battery of mobile device 105. USB port 605 may include an electrical connection for the USB that may interconnect docking station 110 with mobile device 105.

NAPT/NAT/bridging system 320 may include, in one exemplary implementation that corresponds to FIG. 4 above, a system on a chip (SOC) that implements NAPT or NAT which modifies network address information in incoming packets for the purpose of translating one IP address space into another (e.g., remaps routable public IP addresses into private, non-routable IP addresses). NAPT/NAT/bridging system 320, when implementing NAPT or NAT, may be used as a firewall to control traffic sent to mobile device 105 via docking station 110, thus, enhancing the security of, and control over, traffic carried by the docked mobile device 105. NAPT/NAT/bridging system 320 may include, in another exemplary implementation that corresponds to FIG. 5 above, a SOC that implements a bridging mode which may forward packets, at layer 2, from network 120/135, though docking station 110, to mobile device 105. Additionally, the SOC implementing the bridging mode may forward packets, at layer 2, from mobile device 105, though docking station 110, to network 120/135.

Communication interface 615 may include a transceiver for communicating with network 120/135. Processing unit 620 may include a processor, microprocessor, or processing logic that may interpret and execute instructions. The instructions may be stored in memory located in docking station 110 (not shown), such as, for example, a random access memory (RAM), a Read Only Memory (ROM), or another type of dynamic or static storage device that may store information and instructions for execution by processing unit 620.

Audio unit 625 may include a microphone for receiving audio input into docking station 110, and may include mechanisms for playback of audio data received from the microphone, or received from mobile device 105. Video unit 630 may include a camera for capturing video, and may further include mechanisms for playback of video data received from the camera, or received from mobile device 105. Display 635 may include a display device that may display video data or other types of data associated with the operation of docking station 110 or mobile device 105. In some implementations, display 630 may include a touch screen display that registers touch input at different locations upon the touch screen. Keypad/touch input unit 640 may include an alphanumeric keypad and mechanisms for receiving indications of touch input from display 635.

NFC reader 645 may include a short range, high frequency system that enables the short range (e.g., 10 centimeters) exchange of data with mobile device 105. When mobile device 105 is placed in proximity to docking station 110 (e.g., device 105 is inserted into docking port 210), NFC reader 645 may "read" device identity information from a corresponding NFC system located in device 105. In addition to device identity information, NFC reader 645 may also read device user identity information from the corresponding NFC system located in device 105. NFC reader 645 may, thus, be used to identify different mobile devices that may be placed in proximity to docking station 110. Bluetooth interface 650 may include a short wavelength system for connecting with, and exchanging data over short distances, with any type of Bluetooth enabled device. Bluetooth interface 650 may, for example, connect with a Bluetooth enabled audio headset that permits a wearer to listen to audio from audio unit 625.

The configuration of components of docking station 110 illustrated in FIG. 6 is for illustrative purposes only. Other configurations may be implemented. Therefore, docking station 110 may include additional, fewer and/or different components than those depicted in FIG. 6. For example, docking station 110 may include a system(s) for implementing an Ethernet switch (not shown in FIG. 6), and/or for implementing or interfacing with Virtual Local Area Networks (VLANs). Docking station 110 may further include a magnetic sensor that may detect the insertion of mobile device 105 into docking port 210 and may thereby initiate various functions at docking station 110 or at mobile device 105 (e.g., initiate execution of a VoIP application at mobile device 105, etc.).

Figure 7:
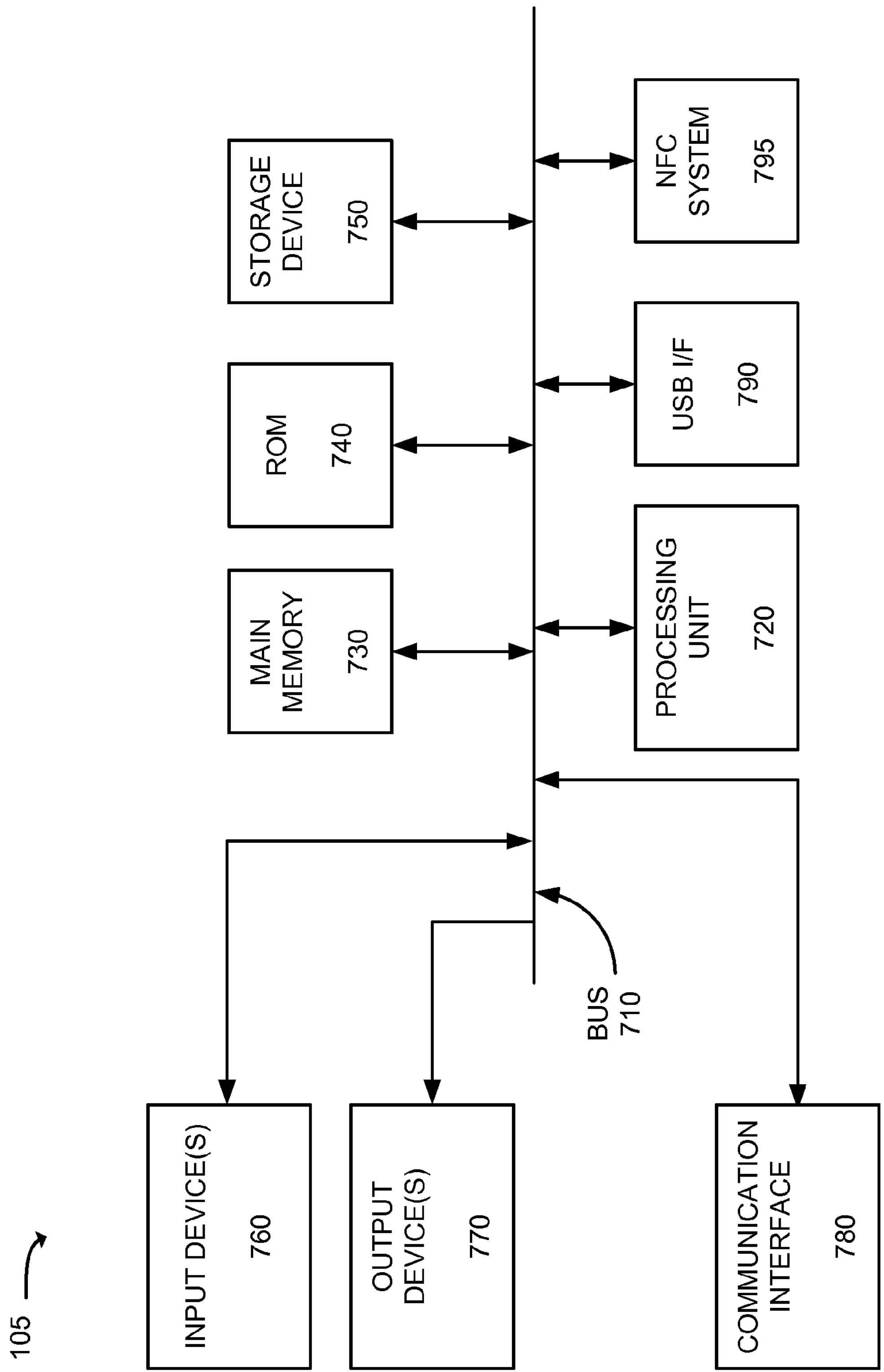
FIG. 7 is a diagram that depicts exemplary components of the mobile device of FIG. 1.

FIG. 7 is a diagram that depicts exemplary components of mobile device 105. Mobile device 105 may include a bus 710, a processing unit 720, a main memory 730, a read only memory (ROM) 740, a storage device 750, an input device(s) 760, an output device(s) 770, communication interfaces 780, a USB interface 790, and a NFC system 795. Bus 710 may include a path that permits communication among the elements of mobile device 105.

Processing unit 720 may include a processor, microprocessor, or processing logic that may interpret and execute instructions. Main memory 730 may include a random access memory (RAM) or another type of dynamic storage device that may store information and instructions for execution by processing unit 720. ROM 740 may include a ROM device or another type of static storage device that may store static information and instructions for use by processing unit 720. Storage device 750 may include a magnetic and/or optical recording medium.

Input device 760 may include one or more mechanisms that permit an operator to input information to mobile device 105, such as, for example, a keypad or a keyboard, voice recognition and/or biometric mechanisms, etc. Output device 770 may include one or more mechanisms that output information to the operator, including a display, a speaker, etc. Communication interfaces 780 may include multiple transceiver mechanisms that enable mobile device 105 to communicate with other devices and/or systems. For example, communication interfaces 780 may include a first radio frequency transceiver for communicating via wireless cellular data network 130. Additionally, communication interfaces 780 may include a second radio frequency transceiver for communication via wireless LAN/WAN 125. USB I/F 790 may include communication interface interconnection mechanisms to permit mobile device 105 to physically and electrically connect with USB port 605 of docking station 110. NFC system 795 may include a short range, high frequency system that enables the short range exchange of data to/from mobile device 105 to docking station 110. When mobile device 105 is placed in proximity to docking station 110 (e.g., device 105 is inserted into docking port 210), NFC system 795 may transmit device identity information and/or device user identity information that may be "read" by NFC reader 645 of docking station 110.

The configuration of components of mobile device 105 illustrated in FIG. 7 is for illustrative purposes only. Other configurations may be implemented. Therefore, mobile device 105 may include additional, fewer and/or different components than those depicted in FIG. 7. For example, mobile device 105 may include a Global Positioning System (GPS) unit that may be used for determining a location of mobile device 105.

Figure 8A:
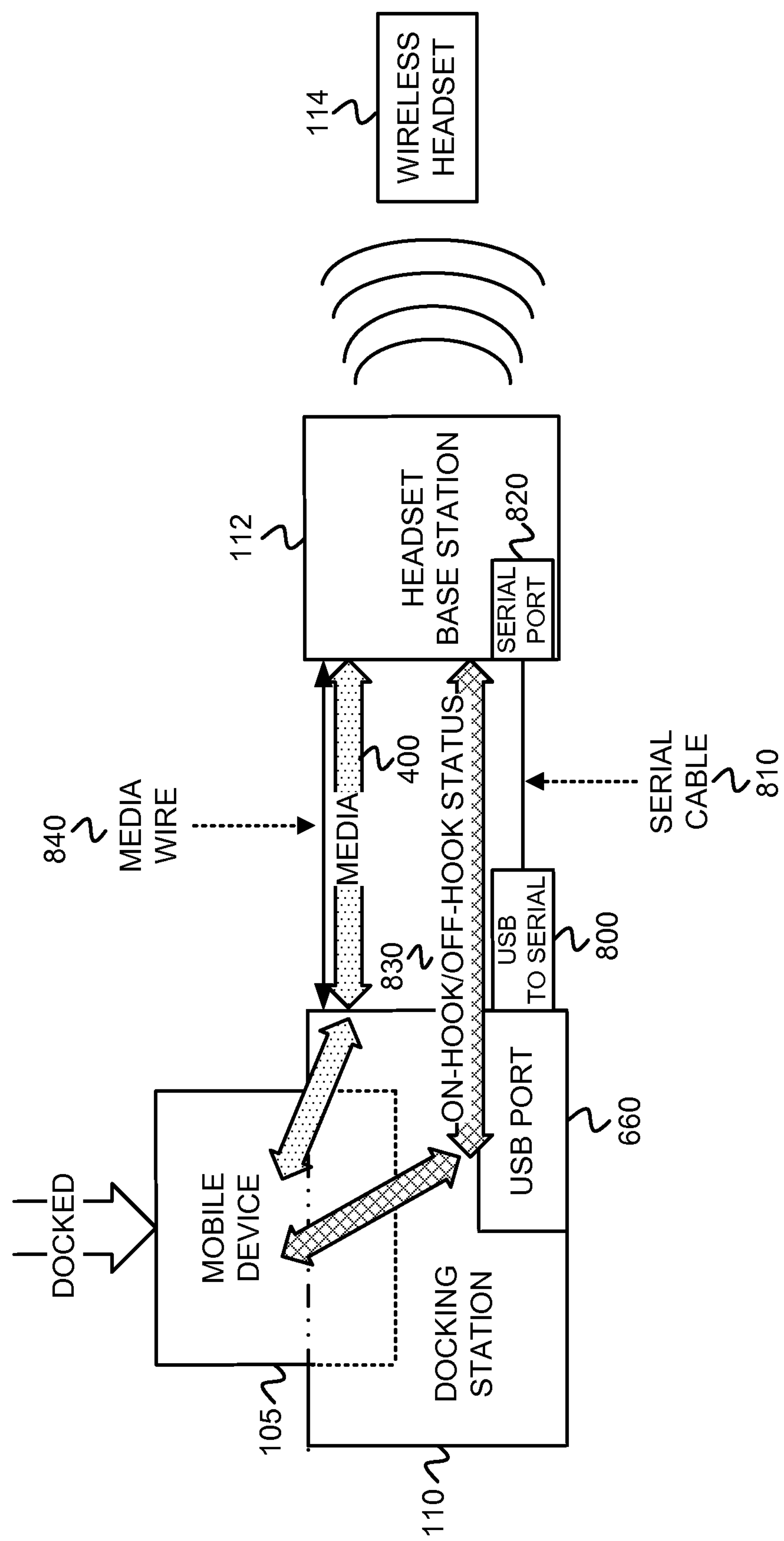
FIG. 8A is a diagram that depicts an exemplary configuration associated with the implementation of electronic hook switch capability into the docking station of FIG. 1 where a serial portion connection between the base station of FIG. 1 and docking station may be used for transmitting on-hook/off-hook status messaging.

FIG. 8A depicts one exemplary configuration associated with the implementation of electronic hook switch capability into docking station 110 such that VoIP calls may be remotely accepted, or terminated, by a wireless hands free device used in conjunction with docking station 110, where a serial portion connection between headset base station 112 and USB port 660 of docking station 110 may be used for transmitting on-hook/off-hook status messaging. As shown in FIG. 8A, a headset base station 112 having a serial port 820 may connect via a serial cable 810 and a USB to serial connector to USB port 660 of docking station 110. Additionally, a media wire 840 may connect between headset base station 112 and docking station 110. In the implementation of FIG. 8A, wireless headset 114 may send an indication of VoIP call acceptance or call termination wirelessly from wireless headset 114 to headset base station 112 and, in turn, headset base station 112 may send a corresponding on-hook/off-hook status message 830 to docking station 110 via serial cable 810 and USB port 660. An Electronic Hook Switch (EHS) signaling protocol may be used for transmitting status message 830 to docking station 110, and docking station 110 may monitor messages received via USB port 660 to retrieve on-hook/off-hook status messages. Additionally, media, such as, for example, audio media (e.g., speech) may be wirelessly transmitted from wireless headset 114 to headset base station 112, and then transmitted via media wire 840 from headset base station 112 to docking station 110. FIG. 8A depicts a two cable implementation for sending media 400 via a media wire 840 and for sending on-hook/off-hook status 830 via a separate serial cable 810 and USB port 660. In another implementation (not shown), media 400 may alternatively be sent via serial cable 810 and USB port 660, and media wire 840 may be eliminated.

Figure 8B:
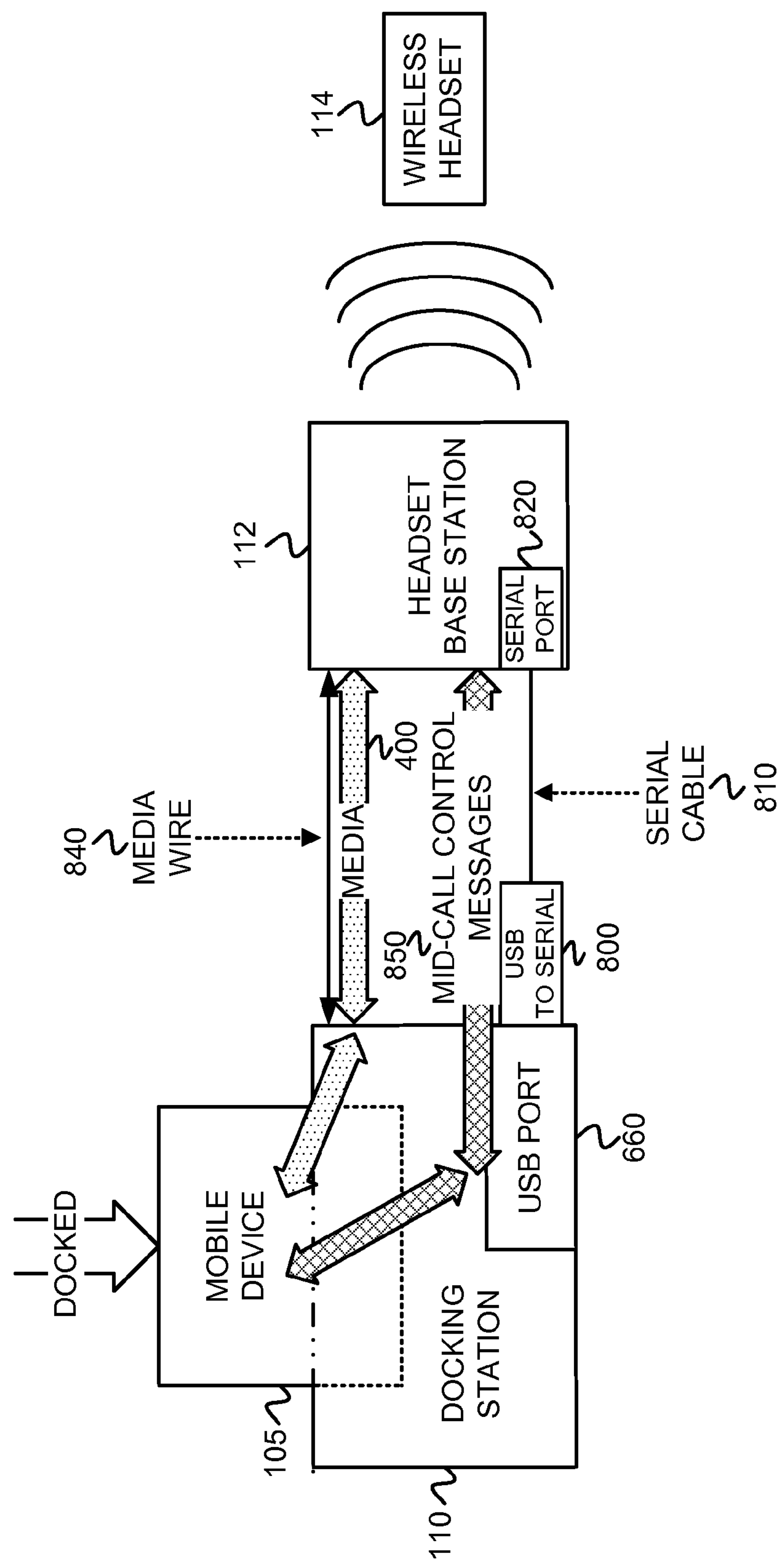
FIG. 8B is a diagram that depicts the implementation of other types of signaling/messaging, such as mid-call control messaging associated with a VoIP call, from the base station to the docking station in the exemplary configuration of FIG. 8A.

FIG. 8B further depicts the implementation of other types of signaling/messaging, such as, for example, mid-call control messaging associated with a VoIP call, from headset base station 112 to docking station 110 in the exemplary configuration of FIG. 8A. The mid-call control messaging may include signaling/messaging associated with the implementation of mid-call control features, such as, for example, call volume, call holding, call transfer, or call conferencing (though other types of mid-call control features may be implemented). As shown in FIG. 8B, wireless headset 114 may send indications of the selection of mid-call control features wirelessly from wireless headset 114 to headset base station 112 and, in turn, headset base station 112 may send corresponding mid-call control messages 850 to docking station 110 via serial cable 810 and USB port 660.

Figure 9:
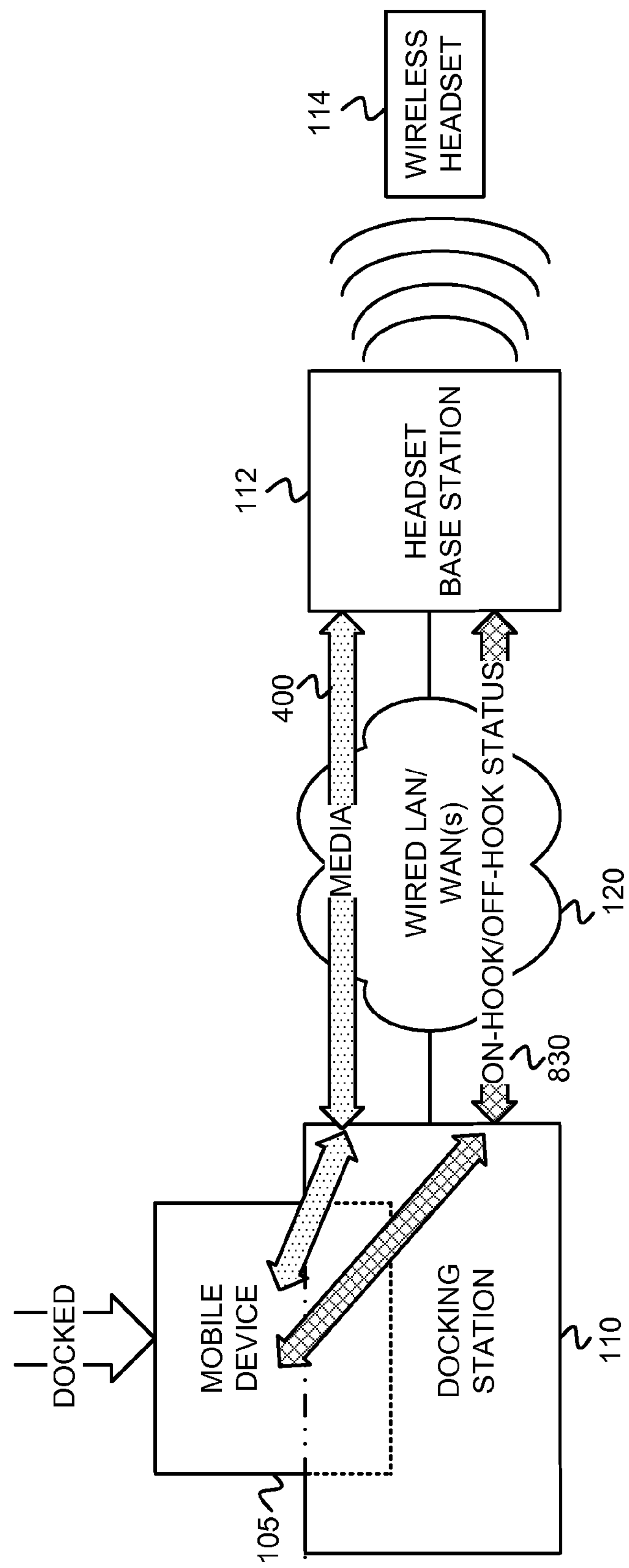
FIG. 9 is a diagram that depicts another exemplary configuration associated with the implementation of electronic hook switch capability into the docking station of FIG. 1 where a wired network connection between the base station and the docking station may be used for transmitting on-hook/off-hook status messaging.

FIG. 9 depicts another exemplary configuration associated with the implementation of electronic hook switch capability into docking station 110 such that VoIP calls may be remotely accepted, or terminated, by a wireless hands free device used in conjunction with docking station 110, where a wired network connection (e.g., a wired LAN/WAN) between headset base station 112 and docking station 110 may be used for transmitting on-hook/off-hook status messaging. As shown in FIG. 9, on-hook/off-hook status messages 830, and media 400, may be sent from wireless headset 114 via headset base station 112 to docking station 110 via wired LAN/WAN 120.

Figure 10:
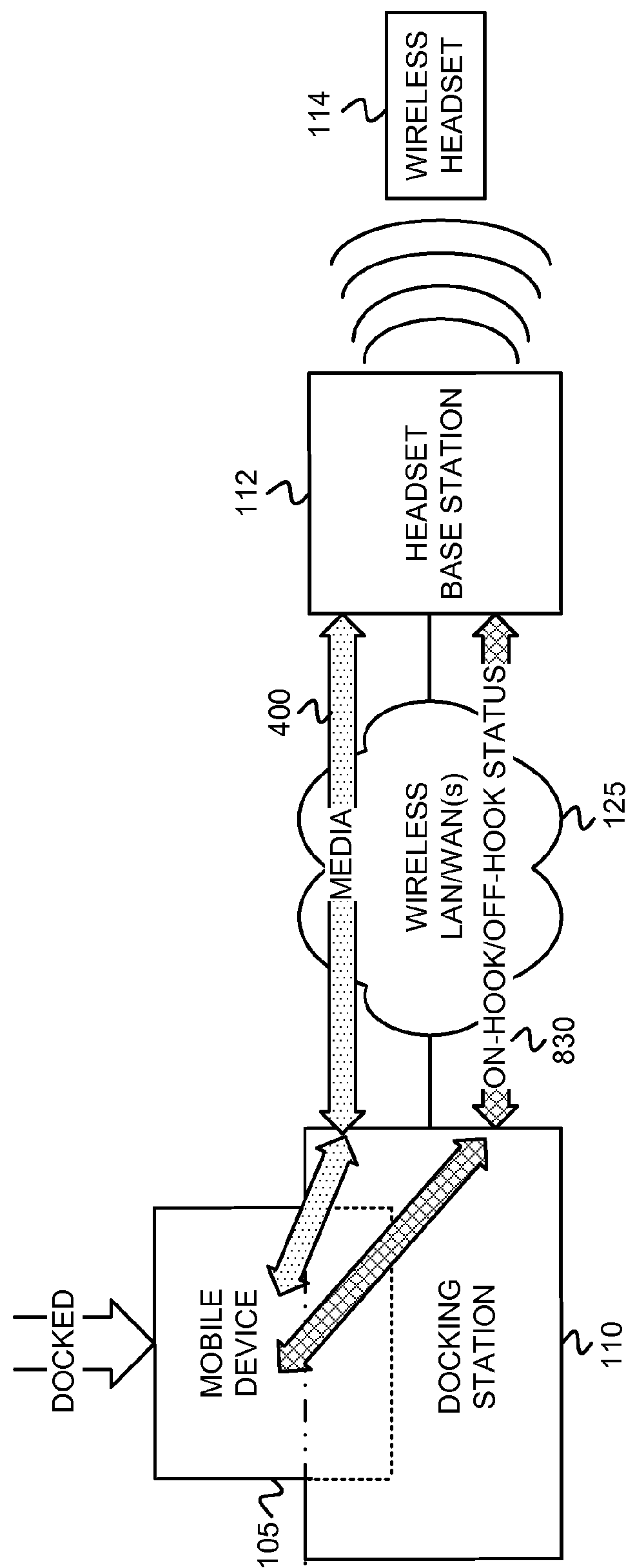
FIG. 10 is a diagram that depicts yet another exemplary configuration associated with the implementation of electronic hook switch capability into the docking station of FIG. 1 where a wireless network connection between the base station and the docking station may be used for transmitting on-hook/off-hook status messaging.

FIG. 10 depicts yet another exemplary configuration associated with the implementation of electronic hook switch capability into docking station 110 such that VoIP calls may be remotely accepted, or terminated, by a wireless hands free device used in conjunction with docking station 110, where a wireless network connection (e.g., a Wi-Fi connection) between headset base station 112 and docking station 110 may be used for transmitting on-hook/off-hook status messaging. As shown in FIG. 10, on-hook/off-hook status messages 830, and media 400, may be sent from headset base station 112 to docking station 110 via wireless LAN/WAN 125.

Figure 11:
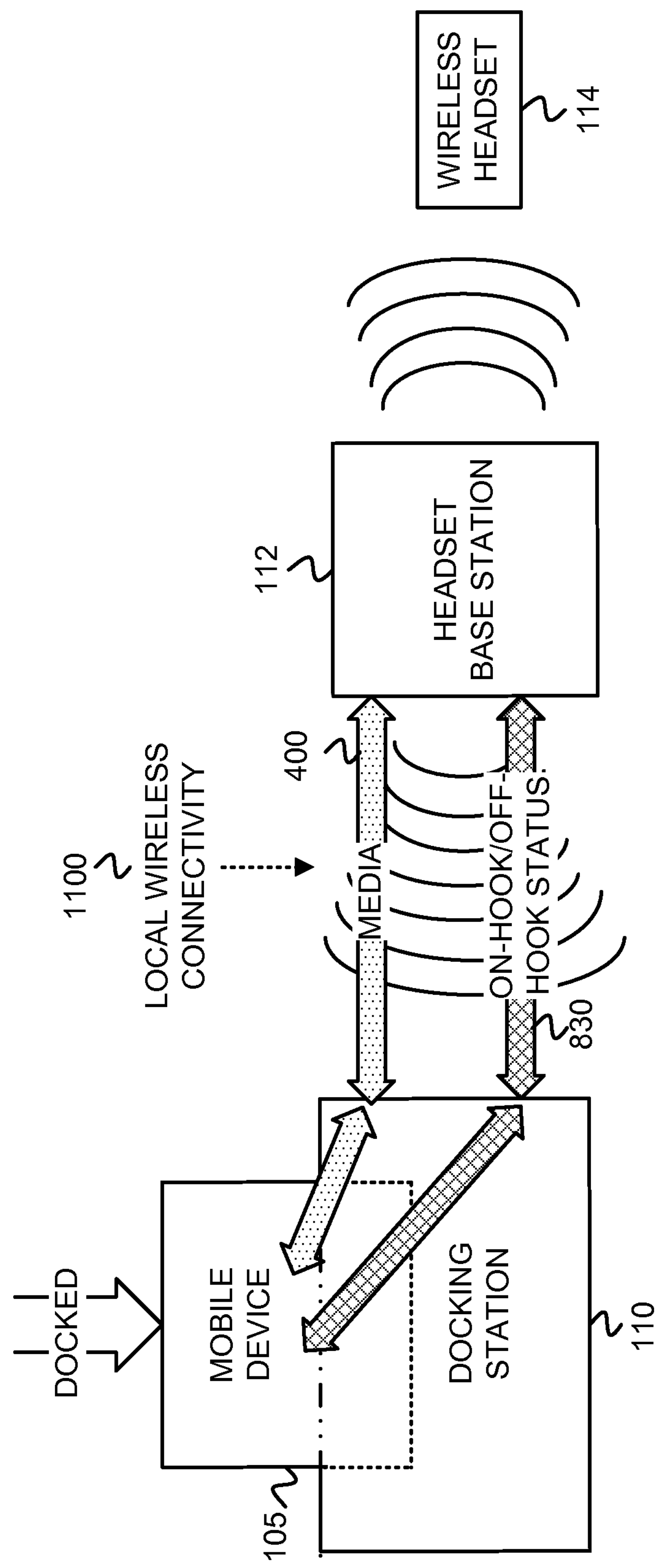
FIG. 11 is a diagram that depicts a further exemplary configuration associated with the implementation of electronic hook switch capability into the docking station of FIG. 1 where local wireless connectivity between the base station and the docking station may be used for transmitting on-hook/off-hook status messaging.

FIG. 11 depicts a further exemplary configuration associated with the implementation of electronic hook switch capability into docking station 110 such that VoIP calls may be remotely accepted, or terminated, by a wireless hands free device used in conjunction with docking station 110, where local wireless connectivity (e.g., a BlueTooth connection) between headset base station 112 and docking station 110 may be used for transmitting on-hook/off-hook status messaging. As shown in FIG. 11, on-hook/off-hook status messages 830, and media 400, may be sent from wireless headset 114 via headset base station 112 to docking station 110 via local wireless connectivity 1100 (e.g., via a BlueTooth connection).

Figure 12:
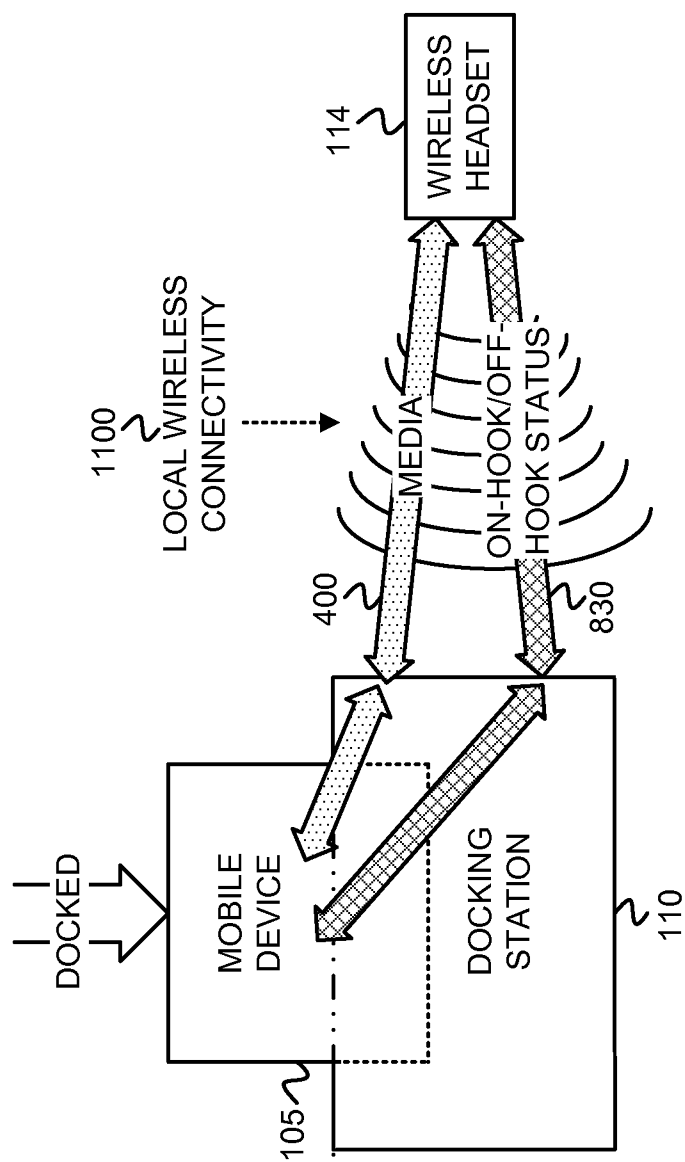
FIG. 12 depicts an additional exemplary configuration associated with the implementation of electronic hook switch capability into docking station 110 such that VoIP calls may be remotely accepted, or terminated, by a wireless hands free device used in conjunction with docking station 110, where local wireless connectivity (e.g., a BlueTooth connection) between wireless headset 114 and docking station 110 may be used for transmitting on-hook/off-hook status messaging.

FIG. 12 depicts an additional exemplary configuration associated with the implementation of electronic hook switch capability into docking station 110 such that VoIP calls may be remotely accepted, or terminated, by a wireless hands free device used in conjunction with docking station 110, where local wireless connectivity (e.g., a BlueTooth connection) between wireless headset 114 and docking station 110 may be used for transmitting on-hook/off-hook status messaging. As shown in FIG. 12, on-hook/off-hook status messages 830, and media 400, may be sent from directly from wireless headset 114 (i.e., without an intervening headset base station 112) to docking station 110 via local wireless connectivity 1100 (e.g., via a BlueTooth connection). In the exemplary configuration of FIG. 12, base station 112 may be integrated into docking station 110, or into headset 114.

Figure 13:
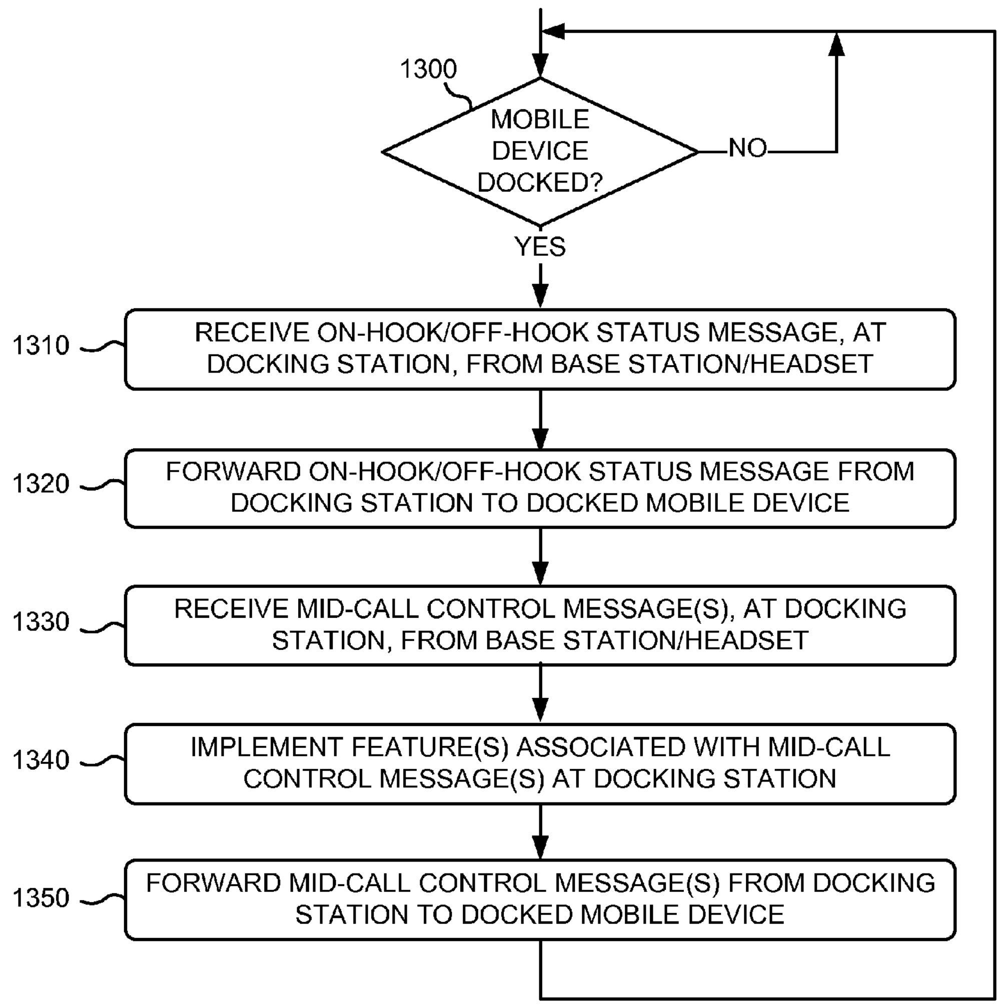
FIG. 13 is a flow diagram that illustrates an exemplary process for implementing electronic hook switch capability into the docking station of FIG. 1 such that VoIP calls may be remotely accepted, or terminated, by a wireless hands free device used in conjunction with the docking station.
Figure 14:
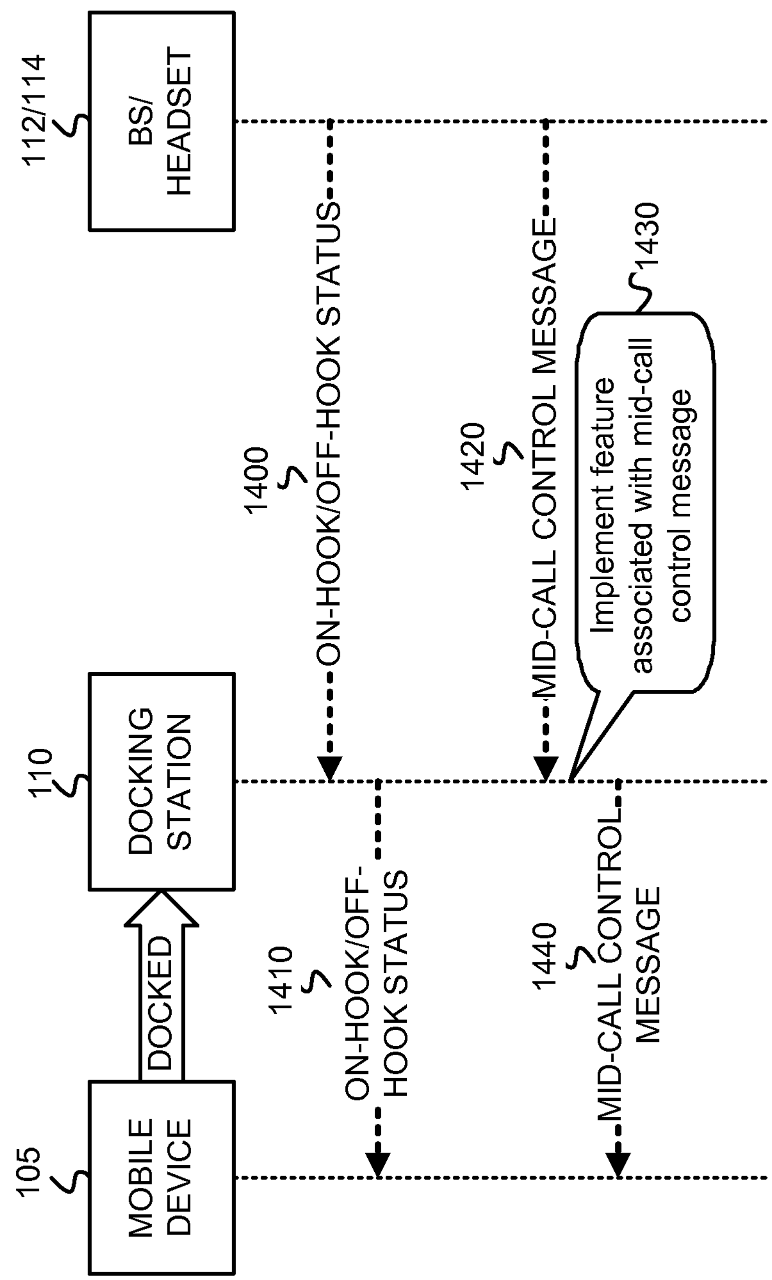
FIG. 14 is a diagram that depicts exemplary messaging associated with the process of FIG. 13.

FIG. 13 is a flow diagram that illustrates an exemplary process for implementing electronic hook switch capability into docking station 110 such that VoIP calls may be remotely accepted, or terminated, by a wireless hands free device used in conjunction with docking station 110. The exemplary process of FIG. 13 may be implemented by docking station 110, and is described below in conjunction with the messaging diagram of FIG. 14. The exemplary messaging diagram of FIG. 14 depicts messaging transmitting in one direction only (i.e., from base station 112/headset 114 to docking station 110). However, in other implementations, docking station 110 may transmit messages and/or media on a reverse path to base station 112/headset 114. The exemplary process of FIG. 13 may be implemented via the exemplary configurations of FIGS. 8A, 8B and 9-12.

The exemplary process may include determining whether mobile device 105 is docked with docking station 110 (block 1300). Docking station 110 may identify when mobile device 105 is inserted into docking port 210, and when mobile device 105 is removed from docking port 210. FIG. 14 depicts mobile device 105 docked within docking station 110. Subsequent to docking mobile device 105 into docking station 110, a VoIP call may be engaged in, with the VoIP being transmitted between headset 114 and docking station 110, and from docking station 110 to phone or application server 145 via network 120, 125 or 130.

Docking station 110 may receive an on-hook/off-hook status message from headset base station 112 or headset 114 (block 1310). If a VoIP call is received at docking station 110, then an on-hook status message from base station 112 or headset 114 enables the call to be completed and transmitted to headset 114 via base station 112. If a VoIP call is received at docking station 110, then an off-hook status message from base station 112 or headset 114 may prevent completion of the call due to another call being in-progress. An on-hook status message from base station 112 or headset 114 may also enable an outgoing VoIP call to be placed from docking station 110. If a VoIP call is in-progress at docking station 110, then an on-hook message received from base station 112 or headset 114 may cause docking station 110 to hang up (i.e., terminate) the in-progress VoIP call. In the exemplary configuration of FIG. 8A, the on-hook/off-hook status message may be received from base station 112 at docking station 110 via serial cable 810, USB to serial adapter 800, and USB port 660. In the exemplary configuration of FIG. 9, the on-hook/off-hook status message may be received from base station 112 at docking station 110 via wired LAN/WAN 120. In the exemplary configuration of FIG. 10, the on-hook/off-hook status message may be received from base station 112 at docking station 110 via wireless LAN/WAN 125. In the exemplary configuration of FIG. 11, the on-hook/off-hook status message may be received from base station 112 at docking station 110 via local wireless connectivity 1100. In the exemplary configuration of FIG. 12, the on-hook/off-hook status message may be received directly from headset 114 at docking station 110 via local wireless connectivity 1100. FIG. 14 depicts base station 112 or headset 114 sending an on-hook/off-hook status message 1400 to docking station 110.

Docking station 110 may forward the on-hook/off-hook message to the docked mobile device 105 (block 1320). Mobile device 105, which may be un-docked from docking station 110 at any time, receives, and may display, incoming or outgoing status information of VoIP calls handled by docking station 110. As shown in FIG. 14, docking station 110 may send an on-hook/off-hook status message 1410 to docked mobile device 105

Docking station 110 may receive a mid-call control message(s) from headset base station 112 or headset 114 (block 1330). Base station 112 or headset 114 may send a particular mid-call control message corresponding to a mid-call control feature initiated by a user at headset 114. The mid-call control feature may include, for example, call volume control, call holding, call transfer, or call conferencing.

In the exemplary configuration of FIG. 8A, the mid-call control message(s) may be received from base station 112 at docking station 110 via serial cable 810, USB to serial adapter 800, and USB port 660. In the exemplary configuration of FIG. 9, the mid-call control message(s) may be received from base station 112 at docking station 110 via wired LAN/WAN 120. In the exemplary configuration of FIG. 10, the mid-call control message(s) may be received from base station 112 at docking station 110 via wireless LAN/WAN 125. In the exemplary configuration of FIG. 11, the mid-call control message(s) may be received from base station 112 at docking station 110 via local wireless connectivity 1100. In the exemplary configuration of FIG. 12, the mid-call control message(s) may be received directly from headset 114 at docking station 110 via local wireless connectivity 1100. FIG. 14 depicts base station 112 or headset 114 sending a mid-call control message 1420 to docking station 110.

Docking station 110 may implement a feature(s) associated with the mid-call control message(s) (block 1340). Docking station 110 may implement, for example, the call volume control, call holding, call transfer, or call conferencing with respect to the VoIP in progress based on the message received in block 1330. FIG. 14 shows docking station 110 implementing 1430 the feature associated with the mid-call control message. Docking station 110 may forward the mid-call control message(s) to the docked mobile device 105 (block 1350). Docking station 110 may keep mobile device 105 informed of call control functions being implemented by forwarding the mid-call control message(s) to mobile device 105 via USB port 605 of docking port 210. Mobile device 105, which may be un-docked from docking station 110 at any time, receives, and may display, mid-call control feature information associated with the messages received from base station 112 or headset 114. FIG. 14 depicts docking station 110 forwarding a mid-call control message 1440 to docked mobile device 105.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIG. 13, the order of the blocks may be varied in other implementations. Moreover, non-dependent blocks may be performed in parallel. In the exemplary implementations of FIGS. 8A, 8B, 9 and 10, a single cable may be used for transmitting/receiving status messages and media between wireless headset 114 and docking station 110, instead of the two cable solution depicted in FIGS. 8A and 8B. In a single cable solution, media wire 840 may be eliminated, and messages and media may be sent/received at docking station 110 via USB port 660.

Certain features described above may be implemented as “logic” or a “unit” that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article “a” is intended to include one or more items. Further, the phrase “based on” is intended to mean “based, at least in part, on” unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A Voice over Internet Protocol (VoIP) docking station, comprising:
- a docking port configured to physically dock with a mobile device;
- a Universal Serial Bus (USB) port configured to be coupled to a hands free device;
- a system configured to handle a VoIP call; and
- a processing unit configured to:
  - receive, via the USB port from the hands free device, a mid-call control message that indicates a mid-call control feature comprising call transfer or call conferencing,
  - implement, at the VoIP docking station in conjunction with the VoIP call, the mid-call control feature indicated in the mid-call control message, and
  - forward, via the docking port to the mobile device, the mid-call control message such that information associated with the mid-call control feature is displayed at the mobile device.

2. The VoIP docking station of claim 1, wherein the USB port via a USB-to-serial-connector and a serial cable to a serial port of a base station that communicates wirelessly with the hands free device.

3. The VoIP docking station of claim 1, wherein the VoIP docking station, when the mobile device is physically docked with the docking port, engages in the VoIP call via a network.

4. The VoIP docking station of claim 1, wherein the docking port includes an input/output port and further comprising:
- a system configured to provide Ethernet/Internet Protocol (IP) access from an external network through the input/output port to the mobile device.

5. The VoIP docking station of claim 4, wherein the system is further configured to enable, via the input/output port, media streaming from the VoIP docking station to the mobile device and from the mobile device to the VoIP docking station.

6. The VoIP docking station of claim 1, wherein the mobile device comprises a digital computing device that has the capability to communicate via multiple different types of networks.

7. The VoIP docking station of claim 1, wherein the mobile device comprises one of a cellular telephone, a tablet computer, or a personal digital assistant (PDA).

8. The VoIP docking station of claim 1, wherein the hands free device comprises a wireless headset.

9. A Voice over Internet Protocol (VoIP) docking station, comprising:
- a docking port configured to physically dock with a mobile device;
- a first communication interface configured to couple to a hands free device via a network connection, wherein the network connection comprises a connection via a wired local area network (LAN) or wide area network (WAN), a wireless LAN or WAN, or short-range wireless connectivity;
- a network address port translation (NAPT), Network Address Translation (NAT) or bridging system configured to send and receive VoIP traffic associated with a VoIP call via the wired LAN or WAN when the docking port is physically docked with the mobile device; and
- a processing unit configured to:
  - receive, via the network connection, a mid-call control message from the hands free device that indicates a mid-call control feature comprising call transfer or call conferencing, apply, at the VoIP docking station, the mid-call control feature indicated in the mid-call control message to the VoIP call, and forward, via the docking port, the mid-call control message to the mobile device.

10. The VoIP docking station of claim 9, further comprising:

a USB port included in the docking port and configured to connect the VoIP docking station to the mobile device when the mobile device is docked in the docking port.

11. The VoIP docking station of claim 9, wherein the wired LAN or WAN, comprises an Ethernet network, wherein the wireless LAN or WAN comprises a wi-fi network, and wherein the short-range wireless connectivity comprises a Bluetooth connection.

12. The VoIP docking station of claim 9, wherein the hands free device comprises a wireless headset.

13. The VoIP docking station of claim 9, wherein the communication interface connects via the wired LAN or the wired WAN to a base station that communicates wirelessly with the hands free device.

14. The VoIP docking station of claim 9, wherein the communication interface connects via the wireless LAN or the wireless WAN to a base station that communicates wirelessly with the hands free device.

15. The VoIP docking station of claim 9, wherein the communication interface connects via short range local wireless connectivity to a base station that communicates wirelessly with the hands free device.

16. The VoIP docking station of claim 9, wherein the communication interface connects via short range local wireless connectivity to the hands free device.

17. The VoIP docking station of claim 9, wherein the processing unit is configured to forward the mid-call control message to the mobile device for display of information associated with the mid-call control feature at the mobile device.

18. A method, comprising:

sending and receiving, at a Voice over Internet Protocol (VoIP) docking station, VoIP traffic associated with a VoIP call when a mobile device is physically docked with the VoIP docking station;

receiving, at the VoIP docking station from a hands free device via a network connection, a mid-call control message that indicates a mid-call control feature comprising call volume control, call holding, call transfer or call conferencing;

applying, at the VoIP docking station, the mid-call control feature indicated in the mid-call control message to the VoIP call; and forwarding, from the VoIP docking station, the mid-call control message to the docked mobile device.

19. The method of claim 18, further comprising:

receiving, at the mobile device, the forwarded mid-call control message; and displaying, at the mobile device, information associated with the mid-call control feature indicated in the mid-call control message.

20. The method of claim 18, wherein the mobile device comprises one of a cellular telephone, a tablet computer, or a personal digital assistant (PDA).

* * * * *